United States Patent
Dingl et al.

(10) Patent No.: US 8,239,088 B2
(45) Date of Patent: Aug. 7, 2012

(54) METHOD FOR IDENTIFYING A DEFECTIVE CONTROL DEVICE

(75) Inventors: Jürgen Dingl, Regensburg (DE);
Markus Roth, Schwalbach (DE);
Jochen Schönhaar, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 624 days.

(21) Appl. No.: 12/281,769

(22) PCT Filed: Feb. 1, 2007

(86) PCT No.: PCT/EP2007/050995
§ 371 (c)(1),
(2), (4) Date: Sep. 4, 2008

(87) PCT Pub. No.: WO2007/101762
PCT Pub. Date: Sep. 13, 2007

(65) Prior Publication Data
US 2009/0012672 A1    Jan. 8, 2009

(30) Foreign Application Priority Data
Mar. 7, 2006 (DE) .......... 10 2006 010 542

(51) Int. Cl.
*G01M 17/00* (2006.01)
*G06F 7/00* (2006.01)
*G06F 11/30* (2006.01)
*G07C 5/00* (2006.01)
(52) U.S. Cl. .................. 701/29.1; 701/29.2
(58) Field of Classification Search .......... 701/29, 701/29.1
See application file for complete search history.

(56) References Cited

U.S. PATENT DOCUMENTS

| | | | |
|---|---|---|---|
| 4,601,199 A | 7/1986 | Denz | 73/118 |
| 5,249,459 A | 10/1993 | Becker | 73/118.1 |
| 5,419,186 A | 5/1995 | Janetzke et al. | 73/118.1 |
| 5,701,866 A | 12/1997 | Sagisaka et al. | 123/339.15 |
| 5,889,205 A | 3/1999 | Treinies et al. | 73/118.2 |
| 2003/0230287 A1* | 12/2003 | Ozeki et al. | 123/479 |
| 2004/0187815 A1* | 9/2004 | Hiraku et al. | 123/90.15 |
| 2004/0237917 A1* | 12/2004 | Yasui et al. | 123/90.15 |
| 2006/0042593 A1* | 3/2006 | Nakamoto et al. | 123/399 |

FOREIGN PATENT DOCUMENTS

| | | |
|---|---|---|
| DE | 4005973 | 2/1990 |
| DE | 4103840 | 2/1991 |
| DE | 4220286 | 6/1992 |
| DE | 19653110 | 12/1996 |
| EP | 0170018 | 6/1985 |
| EP | 0820559 | 4/1996 |
| EP | 1715165 | 3/2006 |
| EP | 1655466 | 5/2006 |

* cited by examiner

*Primary Examiner* — Mary Cheung
*Assistant Examiner* — Michael D Lang
(74) *Attorney, Agent, or Firm* — King & Spalding L.L.P.

(57) ABSTRACT

In a method for identifying a defective control device in an internal combustion engine, especially a control element of an intake manifold with a variable length, a swirl flap, or a tumble flap, or generally a control element in the air path of the internal combustion engine, instead of using a return message acknowledging the position of the control device, a regulating signal is detected following the successful switching of the control device, in order to use any deviations of said regulating signal above a defined threshold value to identify a defective control device.

11 Claims, 3 Drawing Sheets

US 8,239,088 B2

METHOD FOR IDENTIFYING A DEFECTIVE CONTROL DEVICE

CROSS-REFERENCE TO RELATED APPLICATIONS

This application is a U.S. national stage application of International Application No. PCT/EP2007/050995 filed Feb. 1, 2007, which designates the United States of America, and claims priority to German application number 10 2006 010 542.7 filed Mar. 7, 2006, the contents of which are hereby incorporated by reference in their entirety.

TECHNICAL FIELD

The present invention relates to a method for detecting a faulty adjusting device in an internal combustion engine, in particular a variable adjusting device in the air path of the internal combustion engine.

BACKGROUND

In an internal combustion engine with at least one variable adjusting device in its air path the cylinder filling depends on several interconnected parameters. Such a variable adjusting device in the air path of an internal combustion engine is for example a length-variable suction pipe, a swirl valve or a tumble valve. When these variable adjusting devices are used in the air path it is possible to calculate the cylinder filling of the internal combustion engine, for example by applying a physical model. The application of such a model is described in EP-A-0 820 559 B1. To be able to apply such a model, however, it is necessary to have a knowledge of the current position of the adjusting device in the air path.

To describe the current position of the adjusting device by applying a model as stated above the adjusting device could be assumed to be functioning correctly and its position could be identified from the control signal of the adjusting device. In an alternative approach the adjusting device is equipped with a sensor providing a position feedback message which delivers the current position to the above-mentioned model or an engine control system. The first alternative, however, has the disadvantage that if the adjusting device is faulty an incorrect position message is delivered to the above-mentioned model or the engine control system. The position feedback approach of the second alternative represents a high-cost technical solution.

SUMMARY

An inexpensive and effective method for detecting a faulty adjusting device in an internal combustion engine can be provided, so that for example it is no longer necessary to use conventional position feedback systems.

According to an embodiment, a method for detecting a faulty adjusting device in an internal combustion engine, may comprise the following steps: a) activating an operating position of the adjusting device corresponding to a specified operating point of the internal combustion engine, b) controlling the operating position of the adjusting device by means of a control signal based on a comparison between the specified operating point and an actual operating point of the internal combustion engine, and c) comparing the control signal with a threshold value so that a defect in the adjusting device can be detected as a result of the target value being exceeded.

According to a further embodiment, the adjusting device can be an actuator of a length-variable suction pipe, of a swirl valve, of a tumble valve, of a valve control system with variable valve lift, of an external exhaust gas recirculation system and/or generally an actuator of an internal combustion engine coupled to a closed-loop control system. According to a further embodiment, the method may further comprise the further step of describing the specified and the actual operating point of the internal combustion engine by means of a lambda value and/or an air mass value and/or another operation-specific parameter of the internal combustion engine and comparison of these values and/or parameters. According to a further embodiment, the method may further comprise the further step of representing the parameter describing the specified operating point by means of a family of characteristics and/or a calculation program for at least one describing parameter running in a computer module, preferably an engine control system. According to a further embodiment, the method may comprise the further step of activating at least two different positions of the adjusting device while the operating points of the internal combustion engine connected with the two different positions are described by a first and a second family of characteristics and/or calculation program, in particular different activatable absorption lines of the internal combustion engine. According to a further embodiment, the method may comprise the further step of detecting a defect in a second operating position of the adjusting device described by the second family of characteristics and/or calculation program, switchover of the second family of characteristics and/or calculation program to the first family of characteristics and/or calculation program according to a preceding operating position for which no defect has been found and calculation of the describing parameter for the second operating position with the first family of characteristics and/or calculation program, comparison of the parameter determined with the first family of characteristics/calculation program for the second operating position with the actual parameter, and confirmation of a defect in the adjusting device for a movement to the second operating position if the control signal is below the threshold value.

BRIEF DESCRIPTION OF THE DRAWINGS

Embodiments are explained in more detail with reference to the following figures.

DETAILED DESCRIPTION

Figure 1:
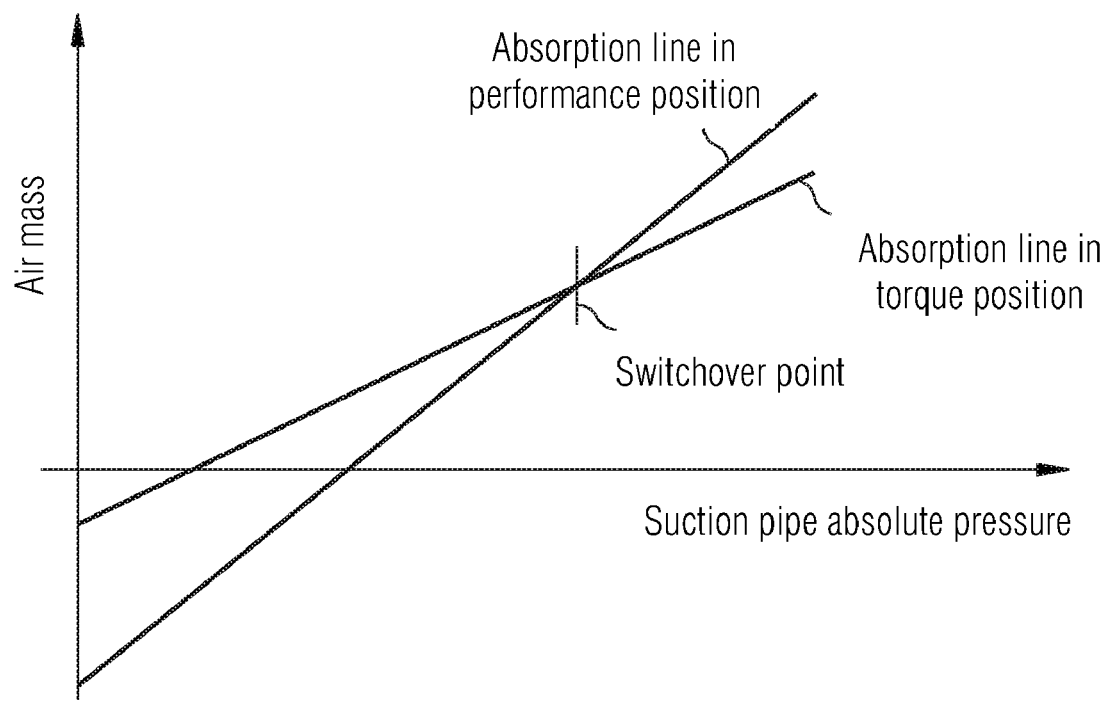
FIG. 1 shows a schematic diagram of two absorption lines of an internal combustion engine for two different suction pipe lengths of the internal combustion engine.

According to various embodiment, a method for detecting a faulty adjusting device in an internal combustion engine, may comprise the following steps: a) activation of an operating position of the adjusting device according to a specified operating point of the internal combustion engine, b) control of the operating position of the adjusting device by means of a control signal based on a comparison between the specified operating point and an actual operating point of the internal combustion engine and c) comparison of the control signal with a threshold value so that if the threshold value is exceeded a defect of the adjusting device is recognizable.

In accordance with an embodiments the adjusting device comprises an actuator of a length-variable suction pipe, of a swirl valve, of a tumble valve, of a valve control with variable valve lift, of an external exhaust gas recirculation system and/or generally an actuator of the internal combustion engine coupled to a closed-loop control system. If owing to a defect the adjusting device is incorrectly set or not set at all this can lead to a deviation between the actual and the calculated air mass for filling the cylinders of the internal combustion engine. This has a corresponding effect on the exhaust emission, so that for example a lambda value of the internal combustion engine shows an unexpected deviation. This deviation must be corrected in the direction of an expected lambda value with the aid of the adjusting device. For this reason a difference between the actual and calculated air mass of the internal combustion engine is attempted to be compensated by the controllers in the engine control system or a control model. If now after a requested switching or adjusting operation of the adjusting device an unusually high controller deflection of the adjusting device occurs in a previously fixed operating window of the internal combustion engine in order to reach a specified operating point of the internal combustion engine, it is possible to conclude on this basis that a position and therefore a function of the adjusting device may not be correct.

The specified and the actual operating points of the internal combustion engine can be preferably described by means of a lambda value, an air mass value and/or another operation-specific parameter of the internal combustion engine. To control the operating position of the adjusting device these values and/or parameters are compared and the control signal of the adjusting device is changed accordingly in order to achieve agreement between the specified operating point and the actual operating point of the internal combustion engine. In this connection the parameter describing the specified operating point is represented by a family of characteristics and/or a calculation program for at least one describing parameter running in a computer module, preferably an engine control system.

It may also be preferred to activate at least two different positions of the adjusting device while the operating points of the internal combustion engine connected with the two different positions are described by a first and a second family of characteristics and/or calculation program. Such different families of characteristics form for example different activatable absorption lines of the internal combustion engine.

In accordance with a further alternative the present method is supplemented by the following steps: detection of a defect in a second operating position of the adjusting device described by the second family of characteristics and/or calculation program, switchover of the second family of characteristics and/or calculation program to the first family of characteristics and/or calculation program according to a preceding operating position of the adjusting device for which no defect has been found, and calculation of the describing parameter for the second operating position with the first family of characteristics and/or calculation program, comparison of the parameter determined with the first family of characteristics/calculation program with the actual parameter and confirmation of a defect in the adjusting device for a movement to the second operating position if the control signal is below the threshold value.

If the present method detects a defect in the adjusting device for a requested movement to a requested operating position, a check routine is optionally run to confirm the defect. As the basis for this check routine it is assumed that as a result of the defect the adjusting device is still in the operating position preceding the requested operating position. To confirm this assumption a switchover is made from the family of characteristics for the requested operating position, for example a second absorption line, to the family of characteristics for the preceding operating position, for example a first absorption line. If now the parameter calculated with the family of characteristics for the previous operating position and the actual operating parameter agree and the control signal only shows a deflection below the threshold value the defect in the adjusting device is thus confirmed.

The various aspects of the various embodiments will be explained by way of example with reference to an internal combustion engine with a suction pipe which can be varied in length by means of an adjusting device or an actuator. In the same way the method described below can also be applied to an actuator of a swirl valve, the actuator of a tumble valve or generally to an actuator in the air path of the internal combustion engine. The adjusting device or the actuators work in conjunction with a control circuit, so that a specified position can be effected in comparison with the actually existing position of the actuator. It is also conceivable for the various embodiments to be applied generally to actuators in the motor vehicle working in conjunction with a control circuit responding to their actuation. The control signals from such control circuits can be registered and assessed in order to draw conclusions about the functional capability of the actuator.

FIG. 1 shows by way of example the effects of a variable length of the suction pipe. To reach a high torque at low rpm, in general the internal combustion engine requires a long suction pipe. To reach a high torque at high rpm, however, a shortened suction pipe is more favorable. Correspondingly, FIG. 1 shows the absorption lines of the internal combustion engine for differently set suction pipe lengths. If the internal combustion engine is operated with a long suction pipe and in the lower rpm range the absorption line in torque position describes the air mass inflow as a function of the absolute pressure of the suction pipe. If the suction pipe length is shortened, when for example the internal combustion engine is running at high rpm, the absorption line is in performance position. It is characterized by a higher increase compared with the absorption line in torque position. The absorption lines for various activatable suction pipe lengths or in other words for different operating positions of the adjusting device of the suction pipe may be preferably represented in each case as a family of characteristics or model calculation in an engine control system of the internal combustion engine. They form the basis for calculating the air mass stream or volume stream for filling the cylinders of the internal combustion engine as a function of the operating point of the internal combustion engine.

If differences are found to exist between the calculated and the actual cylinder filling, controllers and corresponding control algorithms intervene to bring the calculated and actual values into line with each other. A specified and an actual operating point of the internal combustion engine are for example described or identified by a lambda value, an air mass value and/or another operation-specific parameter of the internal combustion engine. By comparing the specified or calculated operation-specific parameter and the actually existing operation-specific parameter it is possible to determine the direction and strength of the control action required to change the operating position of the adjusting device in order to achieve agreement between the calculated and the actual values.

In the example of the absorption lines in FIG. 1 a switchover between different suction pipe lengths at the switchover point does not trigger a control intervention or have any influence on the emission behavior of the internal combustion engine. This is because at the switchover point an identical filling behavior of the cylinders in the internal combustion engine exists in operation with the one or the other suction pipe length. This also permits a torque-neutral switchover of the suction pipe length at the switchover point, so that for example the performance of a motor vehicle is not negatively influenced. If, while the internal combustion engine is running, the load is further increased, more or less big deviations occur between the calculated and the actual cylinder filling of the internal combustion engine as a function of the selected absorption line or the selected operating position of the suction pipe adjusting device in each case. The adjusting device is therefore not in the right operating position for the specified operating point of the internal combustion engine. This may be preferably detected on the basis of deviations between the specified and the actual operation-specific parameter of the internal combustion engine (see above). The engine control system or other suitable control devices therefore adjust the operating position of the adjusting device according to the specified operating point of the internal combustion engine by means of the control signal. By comparing the operation-specific parameter of the internal combustion engine for the specified and the actual operating point continuously or at regular intervals a change in the control signal and thus a change in the operating position of the adjusting device is therefore activated. In this way the model or family of characteristics of the controller is brought into line with reality, which triggers a corresponding deflection of the control signal.

In order to assess the control events taking place the control signal of the control event for the operating position of the adjusting device is recorded. At the same time the size of the control signal is compared with an applicable diagnosis threshold or generally a threshold value. If it is found that the control signal exceeds the threshold value an error is registered in the engine control system and/or a corresponding message is sent back to the controlling model.

If the threshold value is exceeded the control signal is so big that it can be recognized from this that the switchover to an activated suction pipe length corresponding to a certain absorption line has not taken place or has taken place incorrectly. If for example the suction pipe length is switched over to a length corresponding to the absorption line in performance position a switchover is made at the same time in the engine control system to the family of characteristics or model for the absorption line in performance position. In this way the expected cylinder fillings of the internal combustion engine are properly calculated. If, however, owing to a defect in the adjusting device a switchover of the suction pipe length to the absorption line in performance position does not take place the cylinder fillings calculated or specified by the family of characteristics deviate strongly from the actually possible and registered cylinder fillings of the internal combustion engine. This causes a stronger deflection in the control signal of the adjusting device compared with a properly functioning adjusting device in order to bring the actually measured operation-specific parameters into line with the calculated or specified operation-specific parameters. If the adjusting device is defective the control signal exceeds the threshold value already mentioned above, which means that the faulty adjusting device can be identified.

If it is recognized that the switchover to the suction pipe length for the absorption line in performance position has not taken place at all or has taken place incorrectly a further check is optionally made of the faulty adjusting device using a check routine. For this purpose the control model is reset to the family of characteristics of the absorption line in torque position. This enables the expected cylinder fillings to be calculated for the position of the adjusting device in or close to which the adjusting device has probably stopped owing to the defect. Then the calculated values are compared with the actual registered values of the operation-specific parameter or parameters of the internal combustion engine which were determined in connection with the defective adjusting device. According to the results of the comparison the control action as already described above is performed. If the control signal for setting the actual values from the position of the defective adjusting device to the values from the family of characteristics of the absorption line in torque position is below the threshold value, this confirms the defect in the adjusting device. In this way it is ascertained that owing to its defect the adjusting device has stopped in or close to the last position it successfully moved to, for example activation of the suction pipe for the absorption line in torque position.

From the description of the present method provided by way of example it becomes clear that the method can also be applied to other adjusting devices. Thus, in addition to an adjusting device for a length-variable suction pipe, adjusting devices in the internal combustion engine are generally conceivable which work in conjunction with a controlled system for different operating positions and a specification of calculated parameters for the operating positions. For example, the above method can likewise be applied to a valve control system with variable valve lift and to a system for external exhaust gas recirculation.

Figure 2:
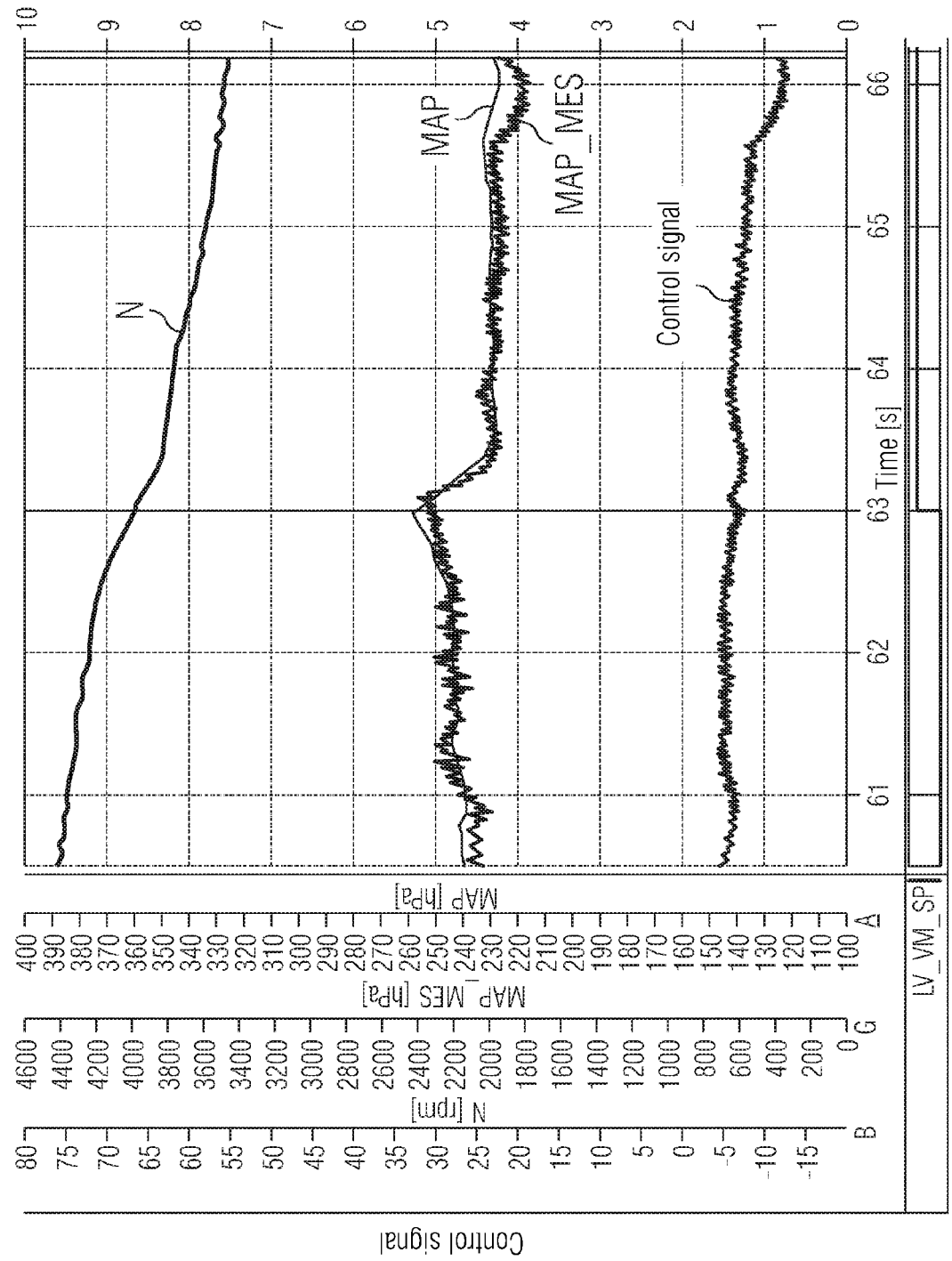
FIG. 2 shows an example of controller deflection on a fault-free adjusting device.

To further illustrate the method described above, FIG. 2 shows measured values and control signals of an adjusting device functioning faultlessly in the variable suction pipe. The time is entered on the X axis of the diagram presented. Below the time axis the course of the signal LV_VIM_SP is shown, which characterizes a switchover of the suction pipe length at the time point of 63 seconds on the time axis. Above the time axis an rpm curve designated with N, a curve designated with MAP for the calculated absolute pressure of the suction pipe and a curve designated with MAP_MES for the measured absolute pressure of the suction pipe are shown. The curve drawn directly above the time axis characterizes the course of the control signal for changing MAP_MES to MAP as a function of time. At the switchover point for the suction pipe length at 63 seconds a conspicuous change in the specified or calculated (MAP) and the measured absolute pressure (MAP_MES) of the suction pipe can be seen. As these two curves follow almost the same path, only a negligible control intervention is required. This is also expressed by the control signal curve and its almost horizontal course. As after switchover of the suction pipe length, i.e. at times above 63 seconds, the control signal does not show a strong deflection compared with the normal, usual deviations, the adjusting device concerned is functioning faultlessly.

Figure 3:
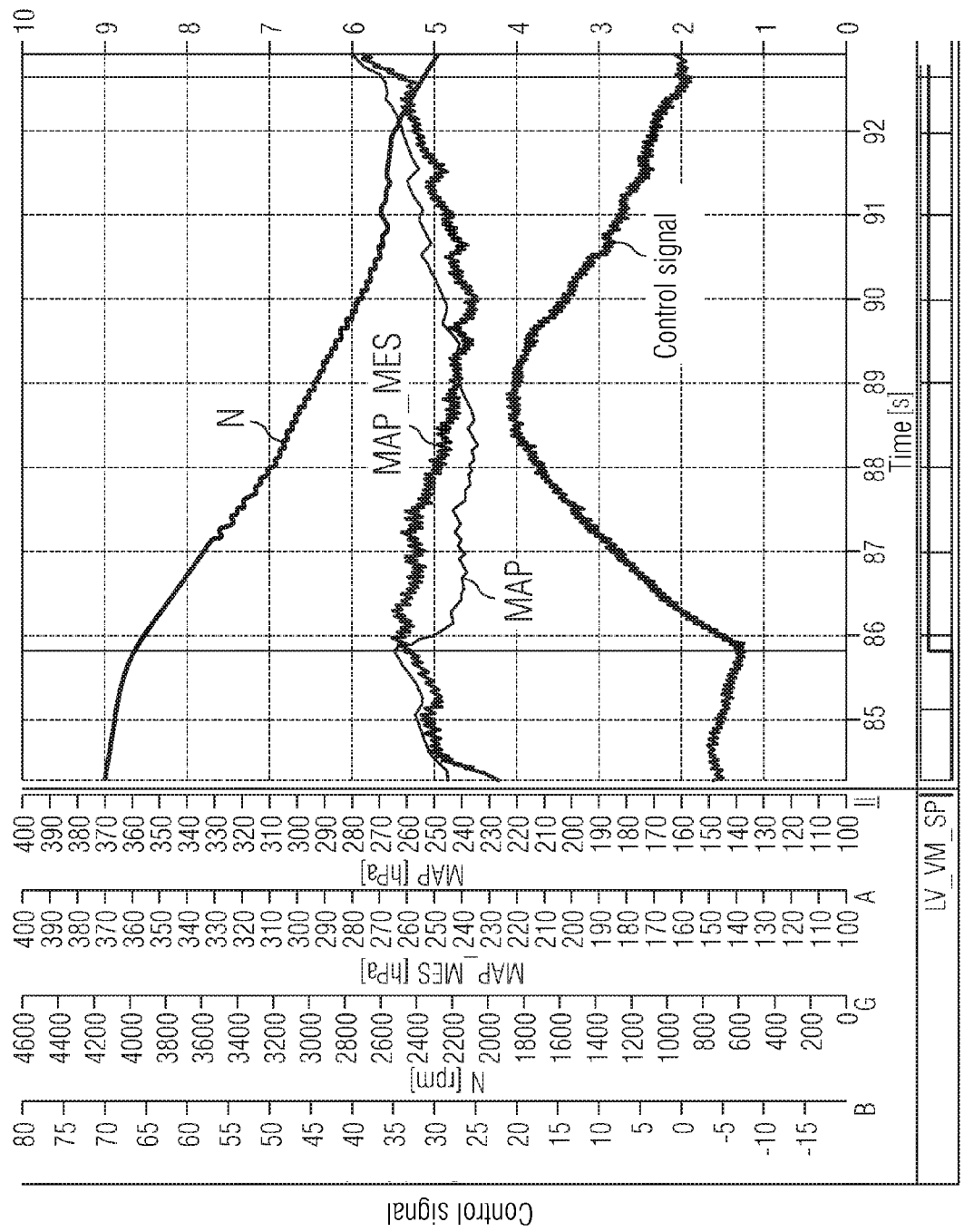
FIG. 3 shows an example of controller deflection on a faulty adjusting device.

FIG. 3 shows the course of the curves just described for a faulty suction pipe adjusting device. As can be seen below the time axis, a switchover of the suction pipe length takes place at the time point of approx. 86 seconds. After switchover has taken place, i.e. for times greater than 86 seconds, an unexpected deviation can be seen between the specified absolute pressure of the suction pipe MAP and the measured absolute pressure of the suction pipe MAP_MES. An attempt is made to compensate this deviation by a control intervention intended to harmonize the two curves. This produces a control deflection i.e. a strong increase in the control signal above 86 seconds compared with the course of the control signal for the fault-free adjusting device (cf. FIG. 2). As the size of the control signal deflection is above a pre-defined threshold value it can be seen that the adjusting device concerned is defective.

The invention claimed is:

1. A method for detecting a faulty adjusting device in an internal combustion engine, comprising the following steps:

activating a change from a first operating position of the adjusting device to a second operation position of the adjusting device corresponding to a specified operating point of the internal combustion engine, the specified operating point of the internal combustion engine being determined by an engine control system based on a second family of characteristics or model corresponding to the second operating position of the adjusting device, based on a comparison between the specified operating point and an actual operating point of the internal combustion engine, generating and sending a control signal to the adjusting device to control the operating position of the adjusting device; and comparing the control signal with a threshold value; and determining that the activated change from the first operating position to the second operation position did not take place or took place incorrectly if the control signal exceeds the threshold value, performing a further check that the first operating position to the second operation position did not take place or took place incorrectly by:

automatically switching the engine control system from the second family of characteristics or model to a first family of characteristics or model corresponding to the first operating position of the adjusting device, determining a reference operating point of the internal combustion engine based on the first family of characteristics or model, determining a reference control signal for adjusting the operating position of the adjusting device to the reference operating point, and confirming that the first operating position to the second operation position did not take place or took place incorrectly if the reference control signal is below the threshold value.

2. The method according to claim 1, wherein the adjusting device is an actuator selected from the group consisting actuators of a length-variable suction pipe, of a swirl valve, of a tumble valve, of a valve control system with variable valve lift, of an external exhaust gas recirculation system, and generally an actuator of an internal combustion engine coupled to a closed-loop control system.

3. The method according to claim 1, comprising the further step:

describing the specified and the actual operating point of the internal combustion engine by means of at least one value selected from the group consisting of: a lambda value, an air mass value, another operation-specific parameter of the internal combustion engine and by comparison of these values or parameters.

4. The method according to claim 3, comprising the further step:

representing the parameter describing the specified operating point by means of a family of characteristics or a calculation program for at least one describing parameter running in a computer module.

5. The method according to claim 4, comprising the further step:

activating at least two different positions of the adjusting device while the operating points of the internal combustion engine connected with the two different positions are described by a first and a second family of characteristics or calculation program.

6. The method according to claim 4, comprising the further step:

activation of at least two different positions of the adjusting device while the operating points of the internal combustion engine connected with the two different positions are described by different activatable absorption lines of the internal combustion engine, the absorption lines defining engine mass flow characteristics.

7. The method according to claim 3, wherein the computer module is an engine control system.

8. The method according to claim 3, comprising the further step:

representing the parameter describing the specified operating point by means of a family of characteristics and a calculation program for at least one describing parameter running in a computer module.

9. The method according to claim 8, wherein the computer module is an engine control system.

10. The method according to claim 8, comprising the further step:

activation of at least two different positions of the adjusting device while the operating points of the internal combustion engine connected with the two different positions are described by different activatable absorption lines of the internal combustion engine, the absorption lines defining engine mass flow characteristics.

11. The method according to claim 8, comprising the further step:

activation of at least two different positions of the adjusting device while the operating points of the internal combustion engine connected with the two different positions are described by a first and a second family of characteristics or calculation program.

* * * * *